(12) United States Patent
Higman

(10) Patent No.: US 6,701,966 B1
(45) Date of Patent: Mar. 9, 2004

(54) APPARATUS FOR LATERAL LINE REPAIR

(75) Inventor: William G. Higman, St. Petersburg, FL (US)

(73) Assignee: Infrastructure Repair Systems, Inc., St. Petersburg, FL (US)

( * ) Notice: Subject to any disclaimer, the term of this patent is extended or adjusted under 35 U.S.C. 154(b) by 0 days.

(21) Appl. No.: 10/420,317

(22) Filed: Apr. 22, 2003

(51) Int. Cl.⁷ ............................................. F16L 55/16
(52) U.S. Cl. ...................... 138/98; 138/97; 405/150.1; 264/269; 156/287
(58) Field of Search ................ 138/98, 97; 156/257; 264/267, 269; 405/150.1

(56) References Cited

U.S. PATENT DOCUMENTS

| | | | |
|---|---|---|---|
| 1,605,782 A | 11/1926 | Rota | 138/98 |
| 3,261,374 A | 7/1966 | Anderson et al. | 138/97 |
| 4,366,012 A | 12/1982 | Wood | 156/93 |
| 5,388,616 A * | 2/1995 | Muller et al. | 138/98 |
| 5,439,033 A * | 8/1995 | Kamiyama et al. | 138/98 |
| 5,454,401 A * | 10/1995 | Kamiyama et al. | 138/98 |
| 5,490,964 A * | 2/1996 | Kamiyama et al. | 264/36.17 |
| 5,503,190 A * | 4/1996 | Kamiyama et al. | 138/98 |
| 5,549,856 A * | 8/1996 | Yokoshima | 264/36.17 |
| 5,598,873 A | 2/1997 | Kamiyama et al. | 138/98 |
| 5,765,597 A | 6/1998 | Kiest, Jr. et al. | 138/78 |
| 5,794,663 A | 8/1998 | Kiest, Jr. et al. | 138/98 |
| 5,916,406 A | 6/1999 | Kamiyama et al. | 156/287 |
| 5,950,682 A | 9/1999 | Kiest, Jr. | 138/98 |
| 5,964,249 A | 10/1999 | Kiest, Jr. | 138/98 |
| 6,021,815 A | 2/2000 | Kiest, Jr. et al. | 138/98 |
| 6,024,910 A | 2/2000 | Kamiyama et al. | 138/97 X |
| 6,089,275 A | 7/2000 | Steketee, Jr. | 138/98 |
| 6,105,619 A | 8/2000 | Kiest, Jr. | 138/98 |
| RE36,859 E | 9/2000 | Storah | 138/98 |
| 6,199,591 B1 | 3/2001 | Kiest, Jr. et al. | 138/98 |
| 6,427,726 B1 * | 8/2002 | Kiest, Jr. | 156/94 |
| 6,478,054 B1 * | 11/2002 | Kiest | 138/98 |

* cited by examiner

Primary Examiner—Patrick Brinson
(74) Attorney, Agent, or Firm—David W. Pettis, Jr., P.A.

(57) ABSTRACT

An improved apparatus for repairing a pipeline by the insertion of a resin-impregnated tubular liner is disclosed wherein the improvement resides in an end cap that is adhesively attached to one end of the liner, the end cap having a pull tab formed thereon and a rope attached thereto. Once the liner has been inverted into the pipeline being repaired and the resin-impregnated tubular liner has been disposed into intimate contact with the interior surface of the pipeline and allowed to cure, the end cap is easily stripped from the liner by pulling on the rope.

6 Claims, 6 Drawing Sheets

APPARATUS FOR LATERAL LINE REPAIR

BACKGROUND OF THE INVENTION

1. Field of the Invention

The present invention relates to an apparatus for lateral line repair in the plumbing industry that is accomplished by the insertion of a liner into the damaged line. It is known in the prior art to accomplish such line repairs by inverting a resin- or epoxy-impregnated liner into the damaged line, typically by the application of fluid pressure, and then allowing the liner to cure in place. The improvement of this invention primarily resides in the construction of the liner to include an end cap that is adhesively secured to a first end of the liner whereby removal of the end cap, after the liner has cured in place, is easily and efficiently accomplished.

2. Description of the Prior Art

It is not at all uncommon for underground plumbing lines, particularly lines typically referred to as lateral lines which extend from a structure to the main sewer line, to become damaged or cracked over time. Repair of these lines can certainly be accomplished by removal of the damaged lines and replacement with a new line or a new line segment, but such repairs are extremely time-consuming and expensive.

The prior art, including prior patent literature, includes numerous examples of apparatus for repairing damaged lines in place, without the necessity of removing or replacing the line. Such repairs are accomplished by gaining access to the damaged line and inserting a liner to "seal" the damage and return the line to full utility. Such prior art devices typically utilize a flexible tube-type member, one surface of which is formed from an impermeable material and the other surface of which is formed from an absorbent, typically felt-type material, that is impregnated with a curable resin before insertion of the tube into the line to be repaired.

According to the prior art, placement of the epoxy-impregnated repair liner is usually accomplished by the application of fluid pressure to invert the impregnated tube into the damaged lateral line so that the epoxy-impregnated surface will be placed into intimate contact with the interior of the damaged line. The fluid pressure utilized to accomplish this makes it necessary for one end of the repair liner to be sealed so as to permit not only inversion as the liner is inserted into the damaged lateral line, but also to fix the epoxy-impregnated surface firmly against the interior wall of the damaged line.

Once the epoxy has cured, the fluid pressure is released and the device which closed one end of the liner for the purpose of maintaining fluid pressure during the insertion and curing process must then be removed. The prior art teaches a variety of structures for closing one end of the tube during insertion and removing the closure after the liner has cured.

However, such closure structures, are, for the most part, complex, awkward, and expensive. According to state-of-the-art apparatus, the closures not only complicate insertion of the repair liner, but also are quite complex in the removal procedures that must be followed. This necessarily increases the cost of the repair and can actually result in repairs that do not function properly.

It is therefore clear that there remains a great need in the art for simple, efficient, and reliable means for not only closing one end of the repair liner during its insertion and curing, but also provides for easy and efficient removal once the liner has cured in place.

SUMMARY OF THE INVENTION

The present invention relates to an improvement in the apparatus currently used for repairing a pipeline wherein the apparatus typically includes an elongate flexible tube member having a first end sealed with an end cap and a second end and comprising an inner resin-absorbent surface and a substantially impermeable outer surface. The resin-absorbent surface is impregnated with an uncured resin material, and means are provided for inserting the resin-impregnated tube member into a damaged pipeline by inverting the impregnated tube on itself so that the resin-impregnated surface will now be on the outside in intimate contact along the interior wall of the pipeline being repaired. Inversion and placement of the repair tube is typically accomplished by fluid pressure. The improvement of this invention comprises an end cap that is adhesively attached to the first end of the tube member whereby, after inversion and curing of the resin, the end cap may be easily and efficiently removed by stripping it away from the tube without damaging the integrity of the repair.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION OF THE INVENTION

Figure 1:
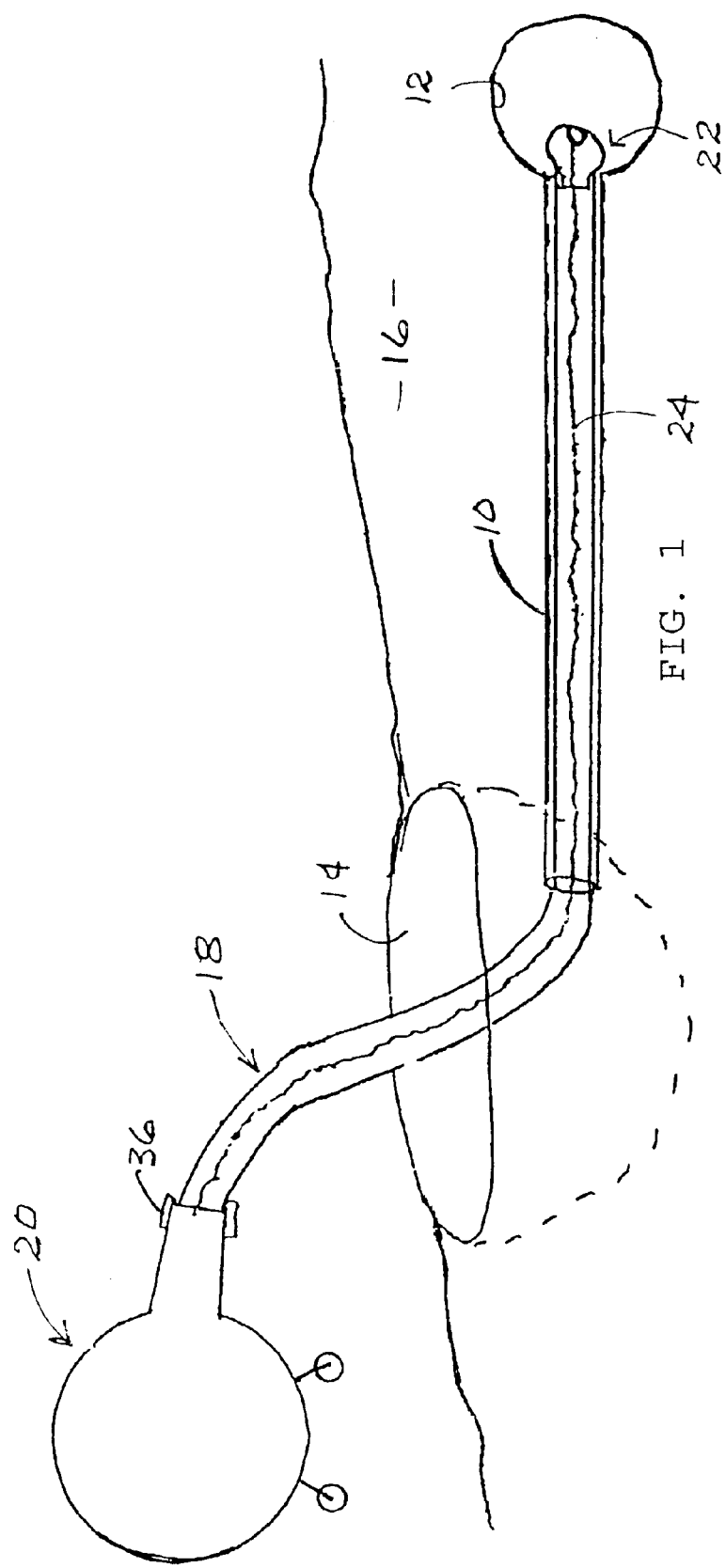
FIG. 1 is a schematic illustration of the improved apparatus of this invention in use.

The present invention relates to an improvement in the apparatus and, somewhat, the method currently used in the plumbing industry for repairing lateral lines. A lateral line is generally defined as the connection between a structure's waste lines and the main sewer line. Due to age, the intrusion of roots, placement of heavy loads on the earth above the lateral line, or a variety of other reasons, lateral lines can become damaged requiring repair for proper disposal of waste from the structure into the main sewer line. While repair may be accomplished by digging up, removing and replacing the lateral line, or replacing damaged sections of the line, such procedures are extremely time-consuming and expensive. Over the years, the plumbing industry has developed apparatus and attendant methods for repairing lateral lines without the necessity of removing the line. Such repairs are currently conducted by the insertion of an impervious liner into the damaged line, after impregnating a contact surface of the liner with epoxy. The liner is placed into the damaged line such that the epoxy-impregnated surface is disposed into intimate contact with the inside wall of the lateral line, and permitting the epoxy to cure. This effectively re-lines the damaged lateral line to restore it to its intended functionality.

Placement of the repair liner is typically accomplished by the application of fluid pressure, preferably air, to place the repair liner in position for curing. Once the cure has been accomplished, because the liner was inserted using fluid pressure, the repair liner must be opened for proper sewage flow. That is to say, according to standard, state-of-the-art apparatus and procedures, one end of the repair liner is sealed, and fluid pressure is used to force the repair liner into position within the damaged lateral line. After the epoxy has cured and the liner has adhered to the interior wall of the lateral line being repaired, it is necessary to remove the structure which sealed the end of the repair liner, or tube. It is with regard to removing this seal that the plumbing industry has encountered difficulty. Current means for providing an end to the repair liner, or tube, so that it can be properly inserted but removed after the epoxy has cured are shown in the prior art, but are complicated, expensive, and subject to failure. It is the purpose of the present invention to provide an improved apparatus for conducting such repairs wherein the improvement comprises a unique end cap that is adhesively secured to one end of the repair tube and easily removed once the repair liner has been cured in place.

However, it is to be understood that while the following detailed description of the improvement of this invention is made with regard to an apparatus for lateral line repair, the improved apparatus is suitable for use in repairing or relining virtually any conduit in need of such repair. Therefore, the scope of the present invention is not to be limited to the plumbing industry and is not to be limited to any specific conduit size, shape, or utility.

According to current procedures for conducting lateral line repair by the insertion of a liner, cleaning and inspection of the line to be repaired is the first step. The line must be clean, free of debris of all kinds, and any changes in pipe dimension and the total number of bends and elbows must be carefully noted. This is typically done by visual inspection of the damaged line using a remote video camera. The length of the line to be repaired is critical and a measurement is taken from the bottom edge of the end of the lateral line where it enters the sewer main, to the access point for insertion of the repair liner. This access point is typically provided in the form of a clean-out access that is provided in the lateral line on its original installation. Once these particular characteristics for the lateral line to be repaired have been determined, the liner is prepared for insertion as will be described in greater detail below.

Turning to the schematic view of FIG. 1, the apparatus of this invention is generally indicated as it would be used to repair a lateral line 10 that is in fluid communication with a main sewer line 12. While not shown in detail, access to lateral line 10 is provided through a hole 14 dug into the earth 16 in which lateral line 10 and main sewer line 12 have been buried. A resin-impregnated tube member is generally indicated as 18, and it is shown as being fully inserted into lateral line 10. Insertion of tube member 18 is accomplished by the means for inserting which is generally indicated as 20 and described in greater detail below. In the schematic view, one may also observe an end cap, generally indicated as 22 at the distal end of tube member 18, and a rope 24 having one end attached to the end cap 22 and extending along the interior of tube member 18 back into the means for inserting 20.

Figure 2:
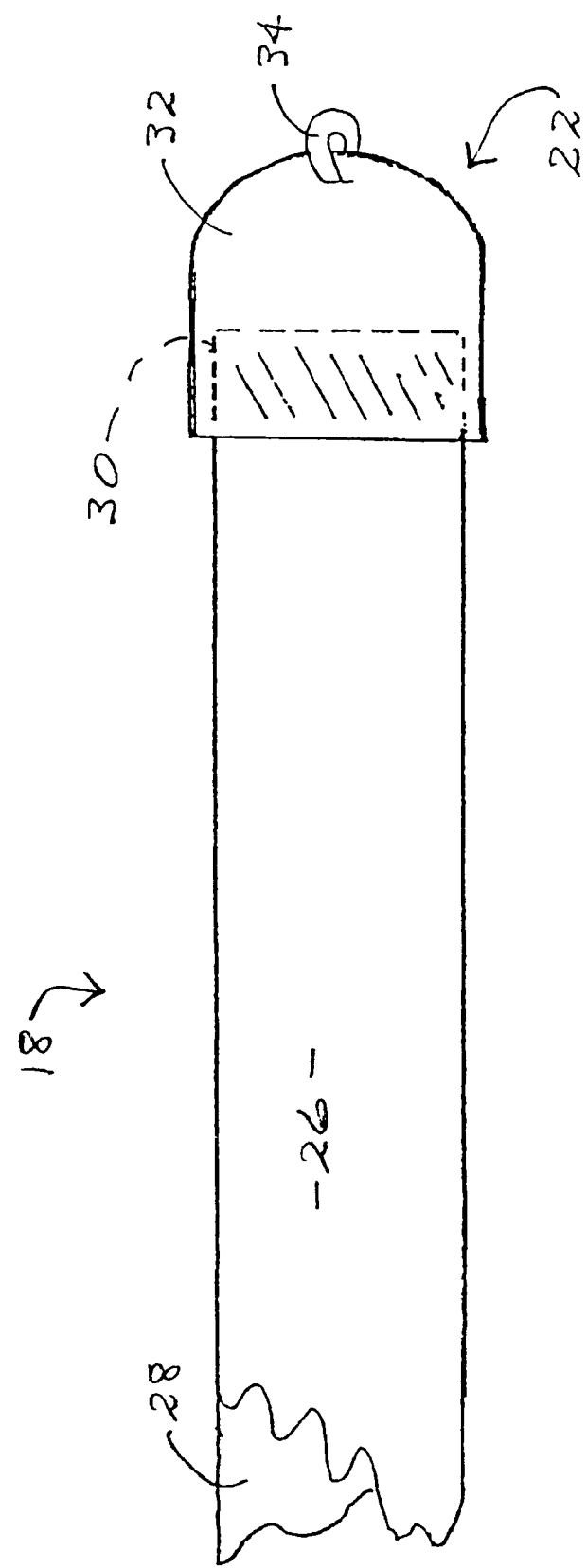
FIG. 2 is a fragmentary view of the flexible tube member and the end cap before placement within the damaged line.
Figure 3:
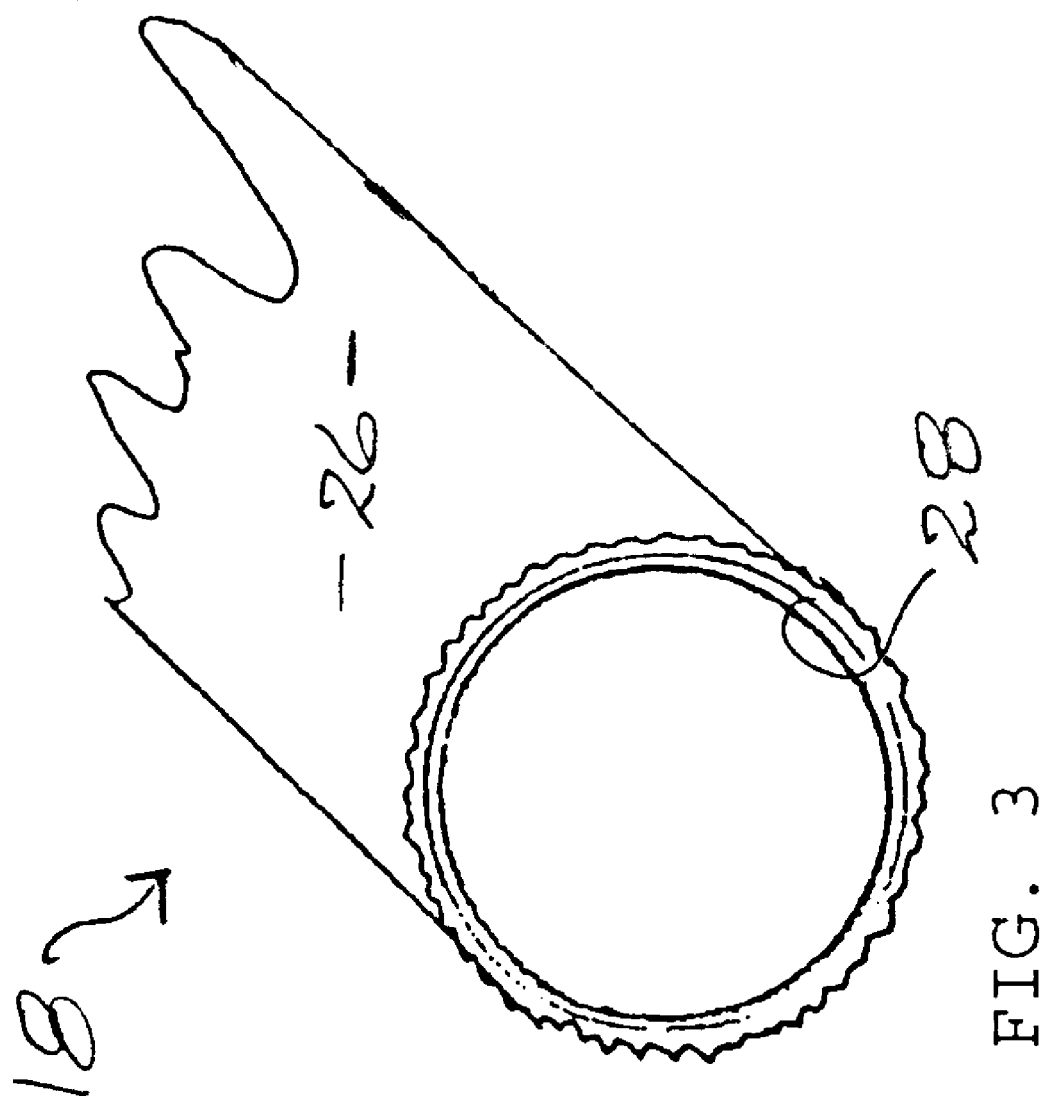
FIG. 3 is a sectional view of the flexible tube shown in FIG. 2.

Referring to the views of FIGS. 2 and 3, details of the tube member 18 may be seen. It is to be noted and remembered that, with the exception of end cap 22, tube member 18 is well-known in the art. Furthermore, in the views of FIGS. 2 and 3 tube member 18 is shown in a non-inverted position. That is to say, the views of FIGS. 2 and 3 depict tube member 18 before its insertion into lateral line 10. As shown in these figures, the exterior surface of tube member 18 is defined by a substantially impermeable material 26, and the interior surface comprises a porous material 28. Porous material 28 is typically felt, and it is this surface that is impregnated with epoxy (not shown) just prior to insertion of tube member 18 into lateral line 10.

As perhaps best seen in the view of FIG. 2, end cap 22 is attached to a first end 30 of tube member 18 in overlying relation to impermeable material 26. End cap 22 comprises an impermeable body 32 having an end cap pull tab 34 disposed on the distal end of impermeable material 32.

Impermeable body 32 of end cap 22 is attached to first end 30 by adhesive. While any one of a variety of adhesives may be used, experimentation has shown a hot melt glue to be quite satisfactory. While the scope of this invention is not to be limited to any particular adhesive for bonding end cap 22 to first end 30, certain characteristics of the adhesive are important. Because significant fluid pressure will be applied to tube member 18 during the insertion procedure, the adhesive bond must exhibit strong holding power in a lap shear mode. That is to say, the adhesive must have the ability to hold well when force is applied in a line of substantially zero degrees with respect to the bond. As will be described in greater detail below, it is also important that the adhesive release well in a peel mode (when the force applied to the adhesive bond is essentially between ninety degrees and one hundred eighty degrees). Of course, because uncured epoxy will saturate porous material 28 prior to insertion of tube member 18, and such epoxies cure as a result of an exothermic reaction, the adhesive used between end cap 22 and first end 30 must also be stable at elevated (above ambient) temperatures. As indicated above, a hot melt glue has proven to be quite satisfactory, but other adhesives including, for example, silicon adhesives, and solvent and aqueous contact adhesives are also believed to be quite satisfactory.

In fact, the adhesive bond between end cap 22 and first end 30 may also be accomplished by the application of a peelable zip strip, similar to those currently employed with bags and boxes.

Figure 4:
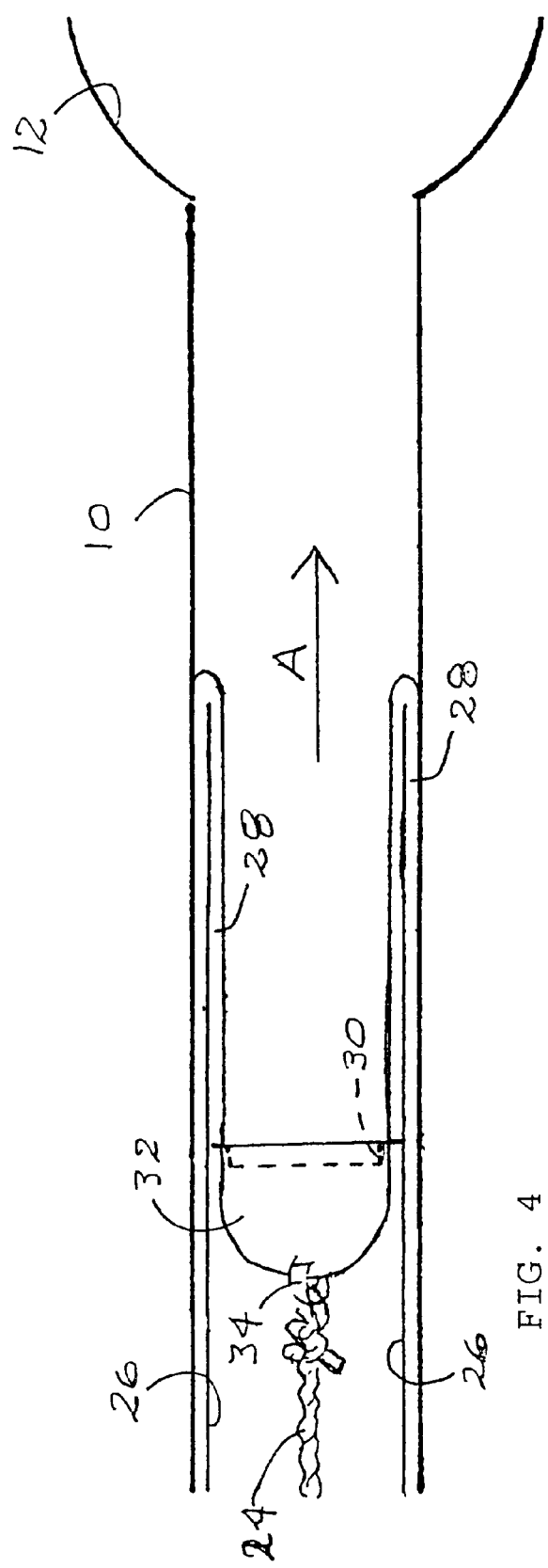
FIG. 4 is a lateral section view of the flexible tube member as it is being inverted and placed within the pipeline to be repaired.

Turning to the FIG. 4, a fragmentary representation of the inversion and insertion of tube member 18 into lateral line 10 is shown. The direction of insertion is indicated by arrow A. As previously described, insertion and inversion of tube 18 so that resin-impregnated porous material 28 is juxtaposed to the interior surface of lateral line 10 is preferably accomplished by air pressure, and the length of tube member 18 has been previously predetermined prior to insertion.

According to known procedures, the tube member 18, substantially as shown in the fragmentary view of FIG. 2, is impregnated with epoxy before it is placed into insertion means 20. This is accomplished by placing the tube 18 on a flat surface and introducing epoxy into the interior. Rollers may be used to ensure that porous material 28 is saturated with epoxy and that all air bubbles are removed. One might even assist impregnation of the porous material 28 by the application of reduced pressure (vacuum) after the epoxy has been introduced. Then, having attached a line or rope 24 to the end cap pull tab 34, the resin-impregnated tube member 18, including rope 24, is placed into the means for inserting 20. Referring to the view of FIG. 1, once tube member 18 has been placed within the means for inserting 20, a second end 36 of tube member 18 is clamped to the exit nozzle of the means for inserting 20. Of course, having saturated the porous material 28 with epoxy, the repair site must necessarily be fully-prepared for insertion of tube member 18, for only a finite period of time is available before the epoxy will begin to harden. Fluid pressure is applied, and tube member 18 enters lateral line 10 as shown in the views of FIGS. 1 and 4.

Figure 5:
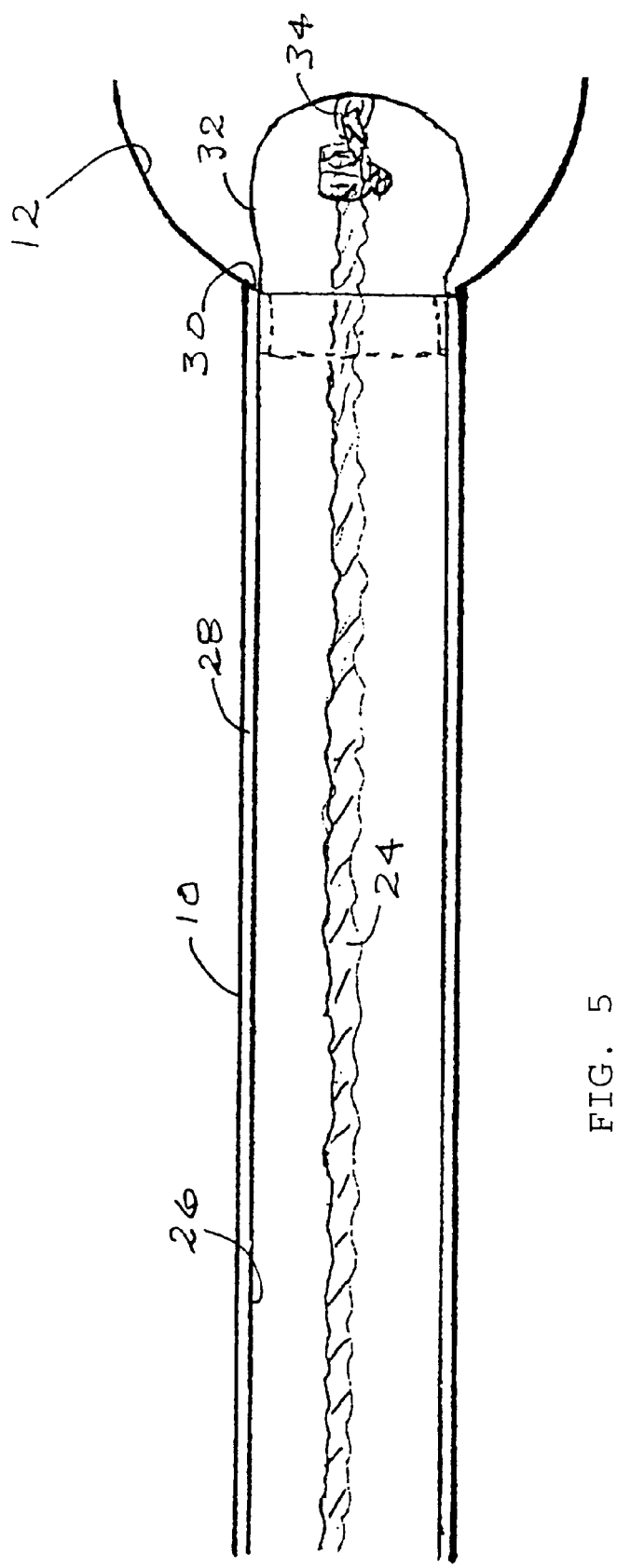
FIG. 5 is a view similar to that of FIG. 4 showing the flexible tube fully inverted.

Turning to the view of FIG. 5, tube member 18 and end cap 22 are shown in the fully-inserted position. This also corresponds to the schematic view of FIG. 1. Tube member 18 is completely inverted, and end cap 22 is similarly inverted so that a substantial portion of end cap 22 actually extends into main sewer line 12. As a result of the measurements taken prior to insertion of tube member 18, first end 30 terminates substantially at the juncture of lateral line 10 with main sewer line 12. Fluid pressure from inserting means 20 is maintained until the resin has cured, typically about two hours from initial mixing of the resin.

Figure 6:
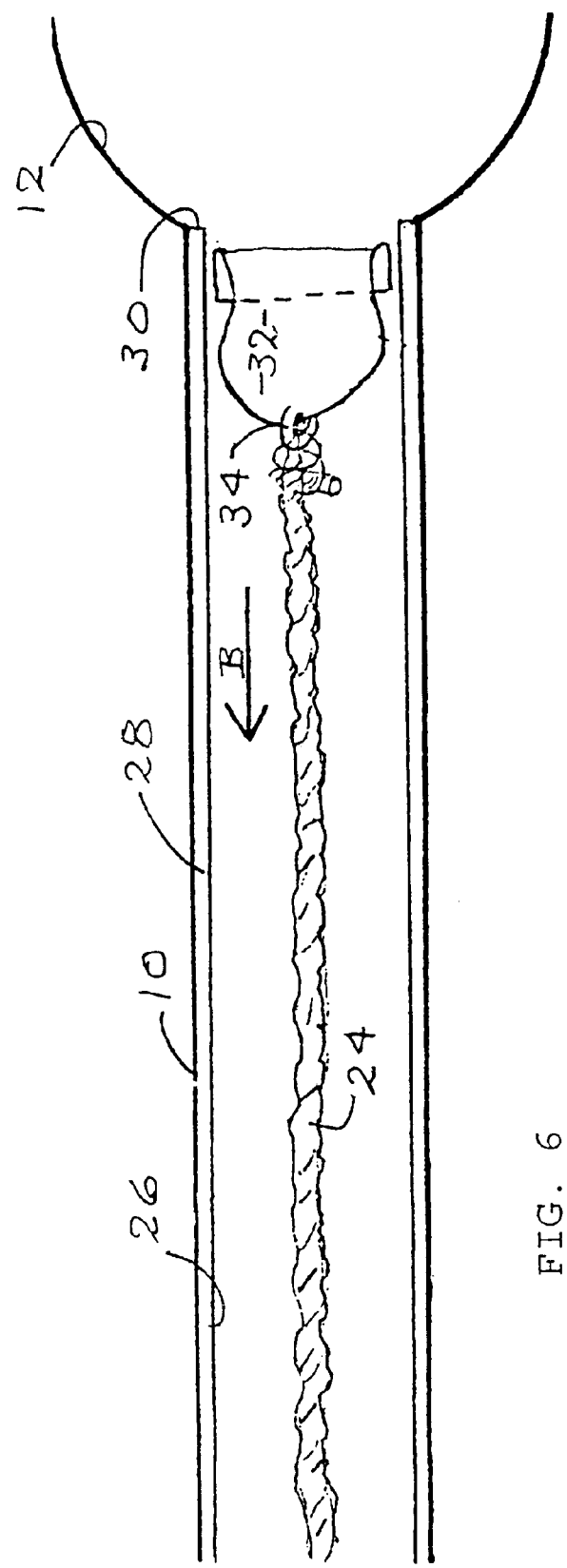
FIG. 6 is a view similar to that of FIG. 5 showing partial removal of the end cap.

Once the resin has cured, fluid pressure is released and rope 24 already wound onto a reel included within the means for inserting 20 is turned, pulling rope 24 and end cap 22 in the direction shown by arrow B of FIG. 6. This necessarily causes end cap 22 to peel away from the now cured tube member 18. Once rope 24 and end cap 22 have been removed, and second end 36 of tube member 18 has been detached from the means for inserting 20, excess portions of tube member 18, extending into hole 14, maybe removed, typically by the use of a saw. Final inspection and completion of the repair may then be concluded.

The actual material comprising impermeable body 32 of end cap 22 may be selected from a variety of impermeable substances, and a vinyl-coated nylon composite material has proven to be quite satisfactory. Of course, any flexible material capable of withstanding a pressure of up to thirty psi for periods of time up to as much as three hours, while maintaining dimensional stability and not being affected by the heat generated as the epoxy resin cures, will be satisfactory. End cap pull tab 34 may be formed from similar material, or may comprise nylon straps, metal or plastic rings, or clamps for securing rope 24 to end cap 22. Of course, rope 24 may be virtually any elongate flexible material.

Thus, by virtue of the improvement provided by this invention, a completed liner within a lateral line may be efficiently and economically accomplished without any remaining obstruction at either end of the repair lateral line.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Now that the invention has been described,

What is claimed is:

1. In an apparatus for repairing a pipeline, the apparatus including an elongate flexible tube member having a first end and a second end and comprising a resin-absorbent surface and a substantially impermeable opposed surface whereby the resin-absorbent surface may be impregnated with uncured resin material, and means for inserting the resin-impregnated tube member into a pipeline by inverting the resin-impregnated tube during insertion so that the resin-impregnated surface may be juxtaposed along an interior wall of the pipeline being repaired by the application of fluid pressure and may adhere thereto as the resin cures, the improvement comprising an end cap adhesively attached to the first end of the tube member, whereby said end cap may be removed from said first end after the resin material has cured.

2. The improvement of claim 1 wherein said end cap is adhesively attached to said impermeable surface of the tube.

3. The improvement of claim 2 wherein said end cap comprises an end cap pull tab formed thereon and extending outwardly therefrom in a direction opposite from said second end of said tube before said tube is inverted.

4. The improvement of claim 3 wherein said end cap pull tab comprises a loop fixed to said end cap.

5. The improvement of claim 3 further comprising an elongate flexible member having a first end thereof attached to said end cap pull tab, whereby said end cap may be removed by pulling on said elongate flexible member after the resin has cured.

6. The improvement of claim 5 wherein said elongate flexible member comprises a rope.

* * * * *